(12) United States Patent
Jackson

(10) Patent No.: US 6,324,455 B1
(45) Date of Patent: Nov. 27, 2001

(54) LASER LEVEL SELECTION

(75) Inventor: Philip Richard Jackson, Governors Bay (NZ)

(73) Assignee: Trimble Navigation LTD, Sunnyvale, CA (US)

( * ) Notice: Subject to any disclaimer, the term of this patent is extended or adjusted under 35 U.S.C. 154(b) by 0 days.

(21) Appl. No.: 09/186,582

(22) Filed: Nov. 5, 1998

(51) Int. Cl.[7] ............................... G01C 1/00; G01B 11/26
(52) U.S. Cl. ........................... 701/50; 701/213; 356/147; 356/152.1; 356/249; 356/138; 455/608; 375/23; 342/457
(58) Field of Search ..................... 701/50, 3; 356/147; 700/207; 37/97

(56) References Cited

U.S. PATENT DOCUMENTS

| | | | |
|---|---|---|---|
| 3,727,332 | * | 4/1973 | Zimmer ..................................... 37/97 |
| 4,299,290 | * | 11/1981 | Nunes, Jr. ............................... 172/4.5 |
| 4,664,518 | * | 5/1987 | Pfund ..................................... 455/606 |
| 4,796,198 | * | 1/1989 | Boultinghouse et al. ............ 700/512 |
| 4,807,131 | * | 2/1989 | Clegg ........................................ 701/3 |
| 5,241,481 | * | 8/1993 | Olsen .................................... 700/207 |
| 5,739,785 | * | 4/1998 | Allison et al. ........................ 342/357 |
| 5,774,826 | * | 6/1998 | McBride ............................... 701/207 |
| 5,949,371 | * | 9/1999 | Nichols ............................ 342/357.01 |
| 6,052,181 | * | 4/2000 | Maynard et al. ..................... 356/147 |
| 6,108,076 | * | 8/2000 | Hanseder .......................... 356/141.1 |

* cited by examiner

Primary Examiner—William A. Cuchlinski, Jr.
Assistant Examiner—Tuan C To
(74) Attorney, Agent, or Firm—Boris G. Tankhilevich

(57) ABSTRACT

The apparatus and the system for precise vertical navigation of a grading machine in profile of a curved job site terrain is disclosed. The system includes an integrated satellite navigational receiver and a laser detector system. A plurality of laser systems generates a plurality of laser beams covering the curved job site terrain. The laser detector system mounted in the grading machine latches on a single laser beam at each location of the grading machine to obtain the precise vertical coordinate of the grading machine.

1 Claim, 7 Drawing Sheets

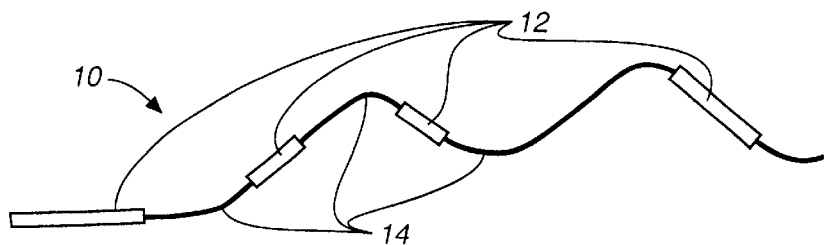
FIG._1
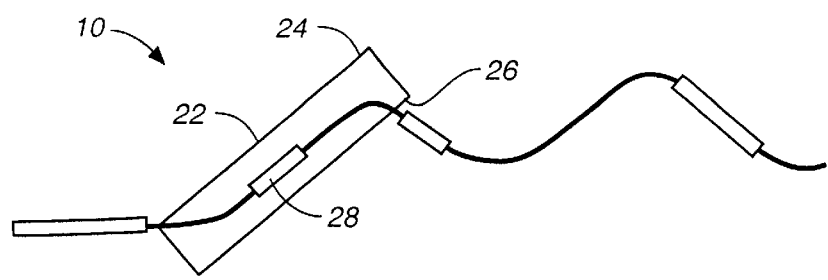
FIG._2
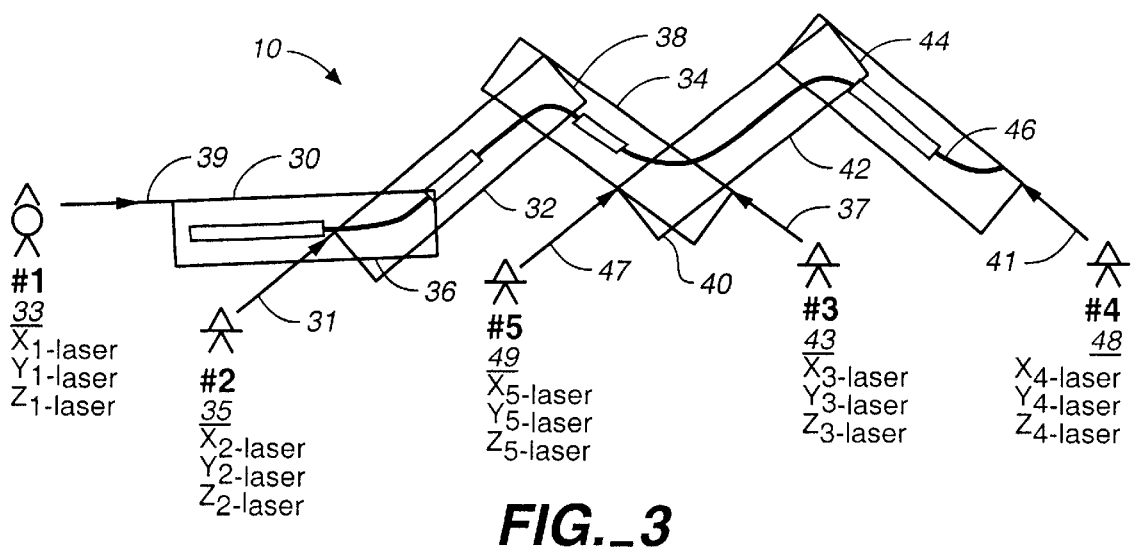
FIG._3

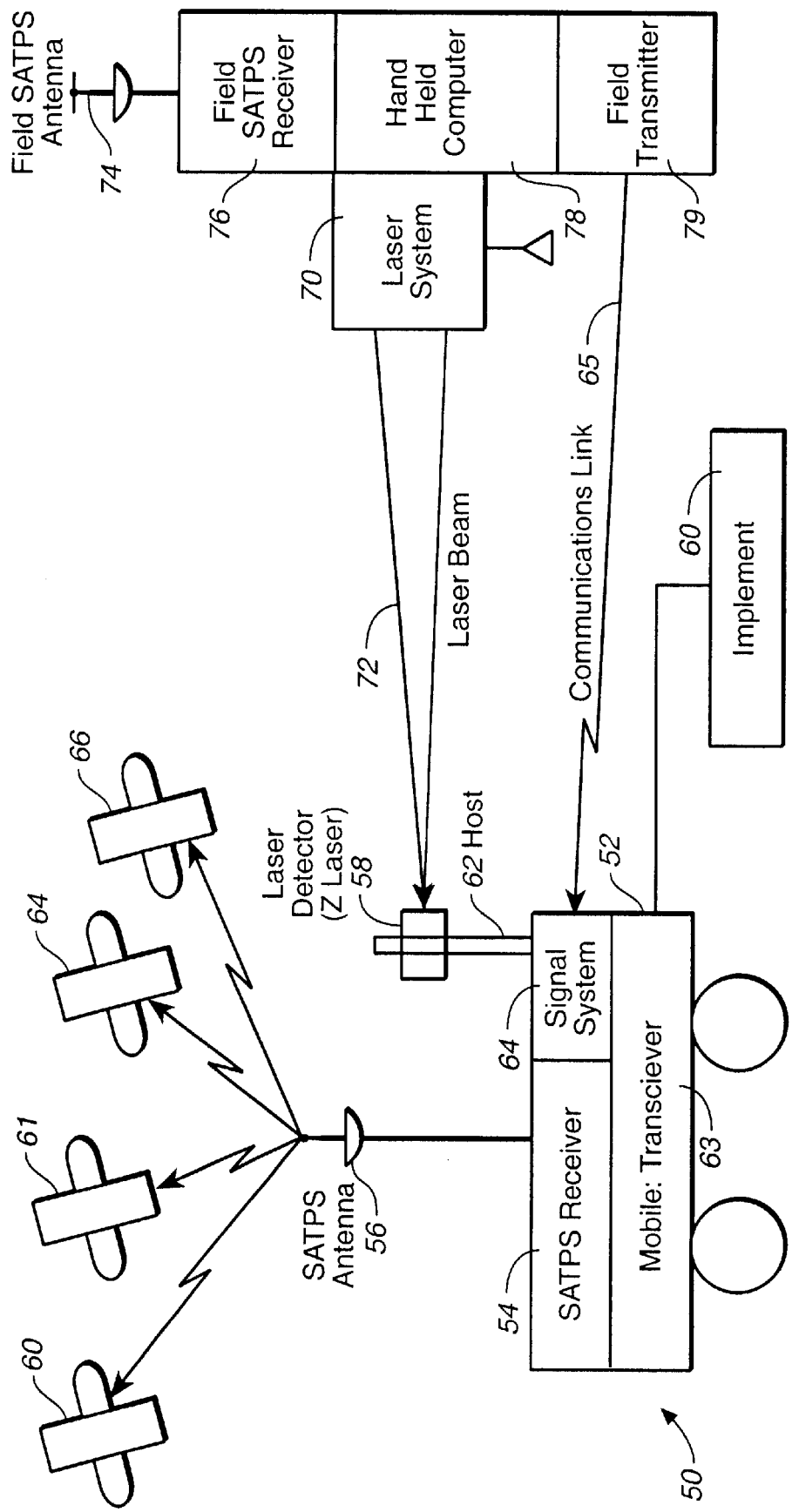
FIG._4

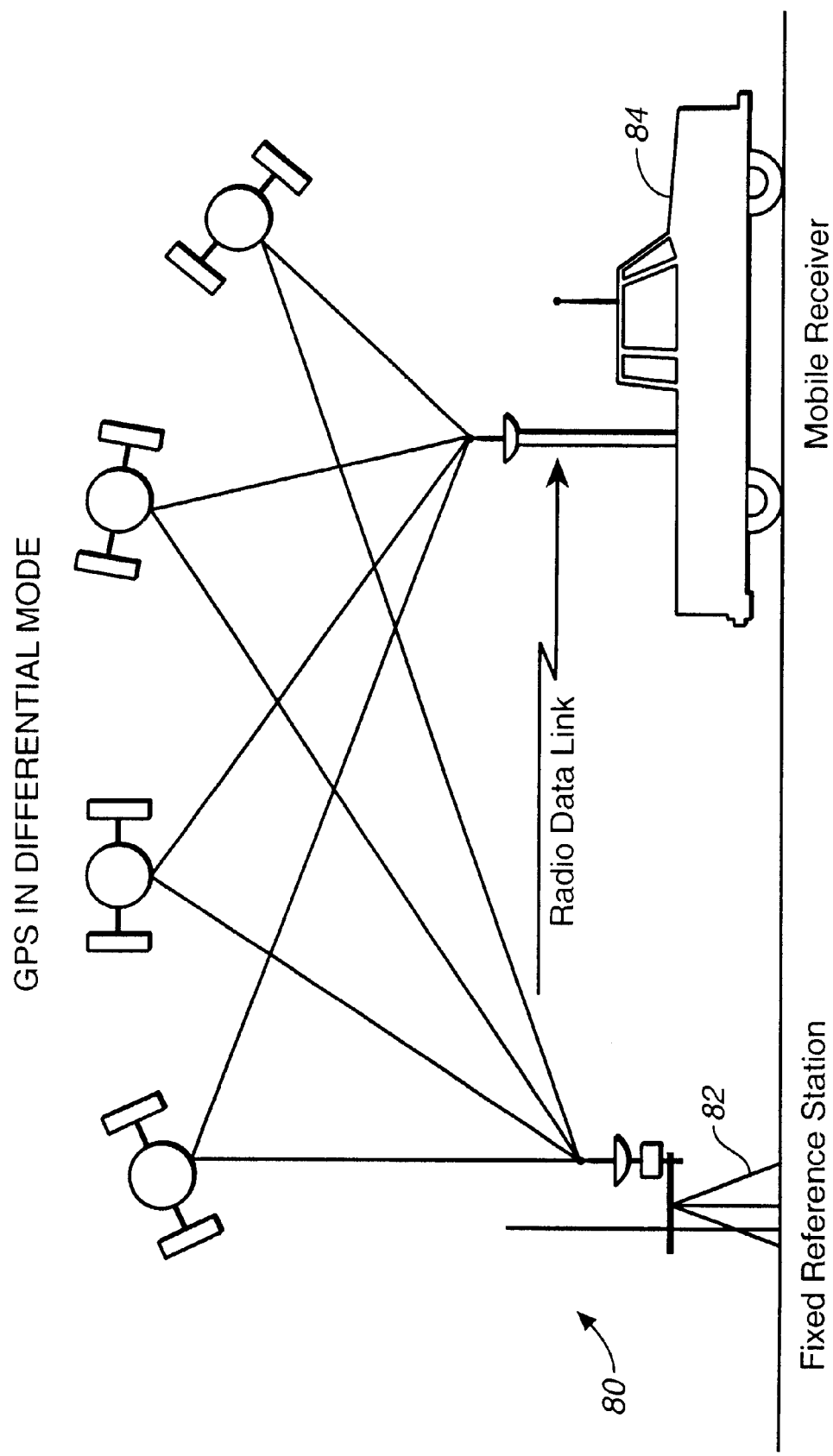
FIG._5

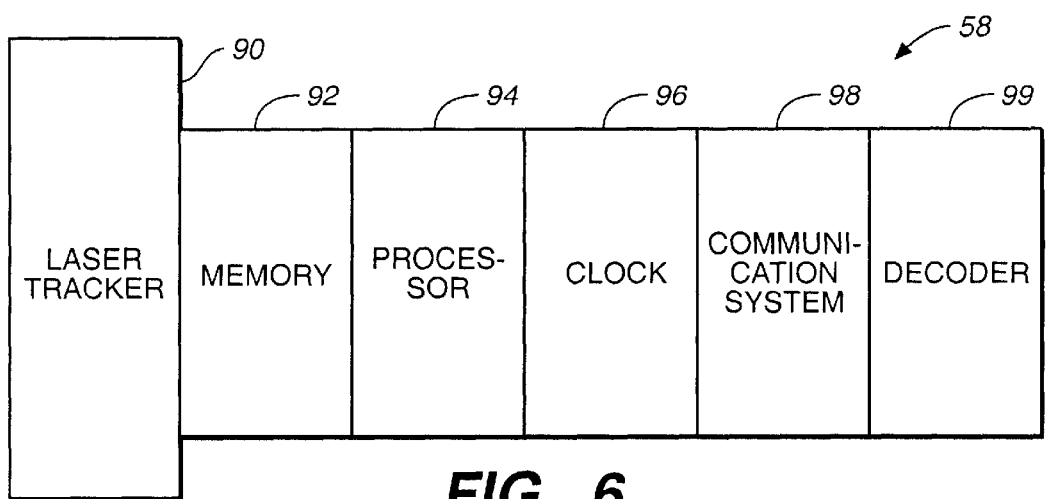
FIG._6
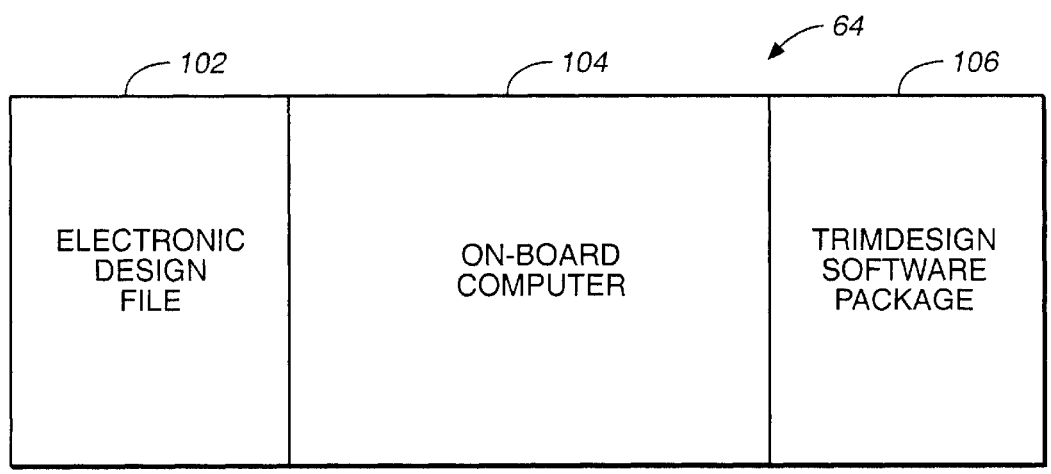
FIG._7
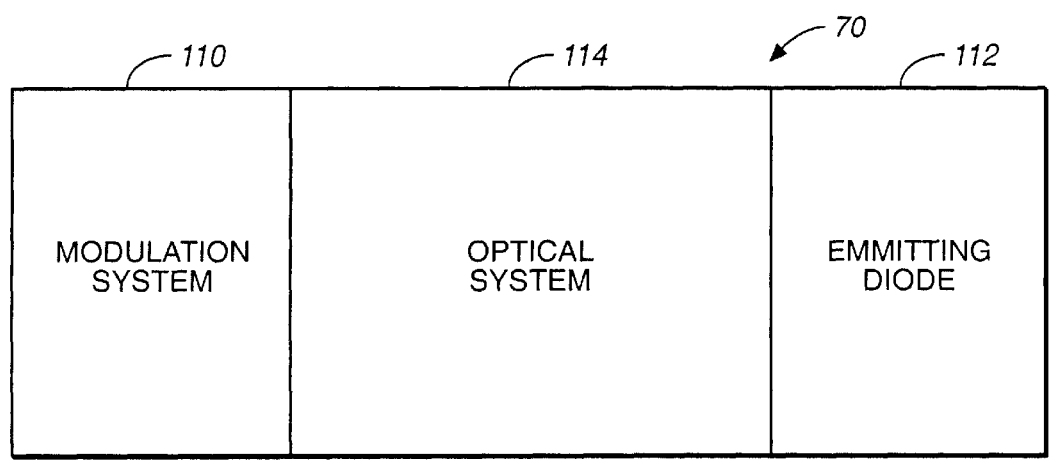
FIG._8

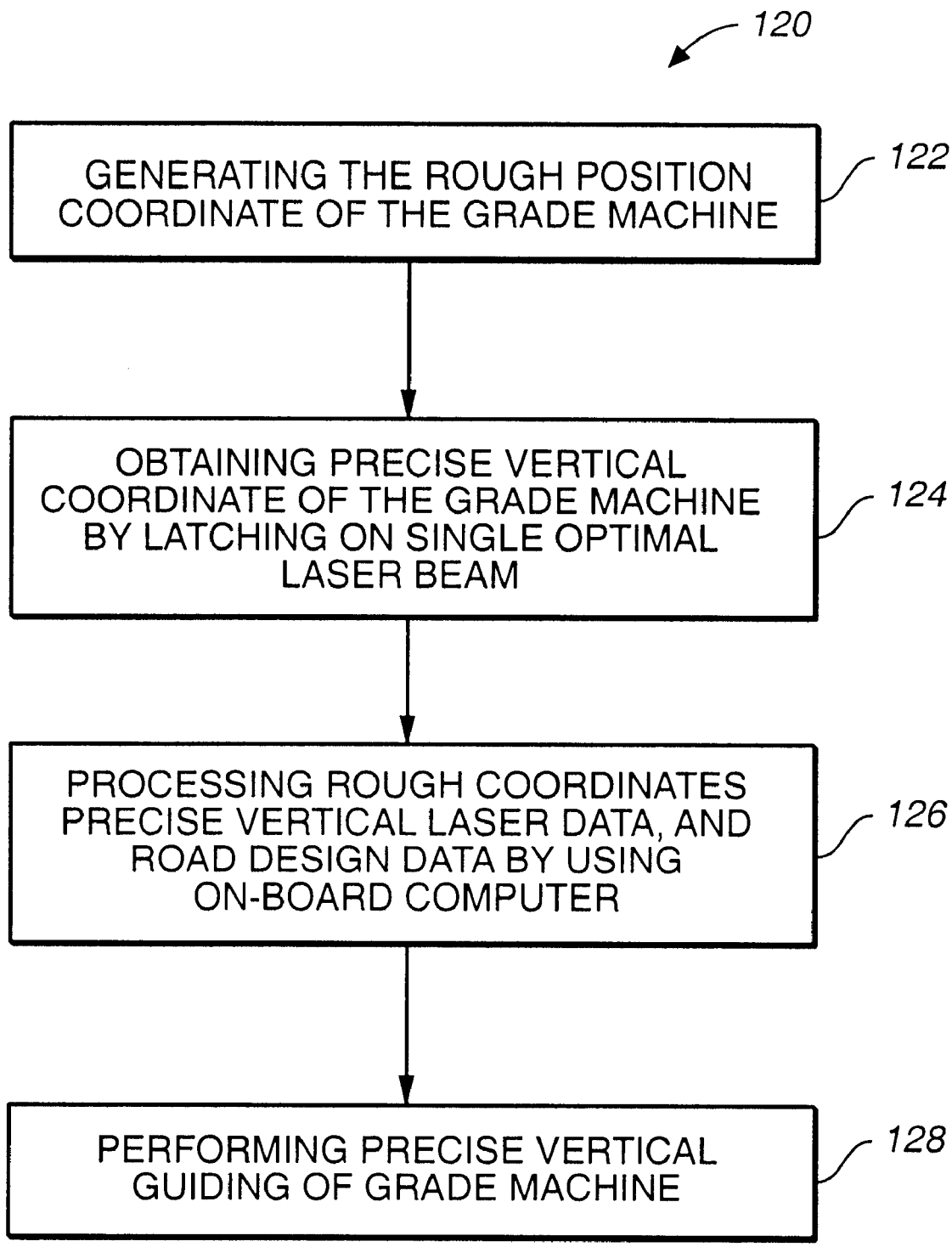
FIG._9

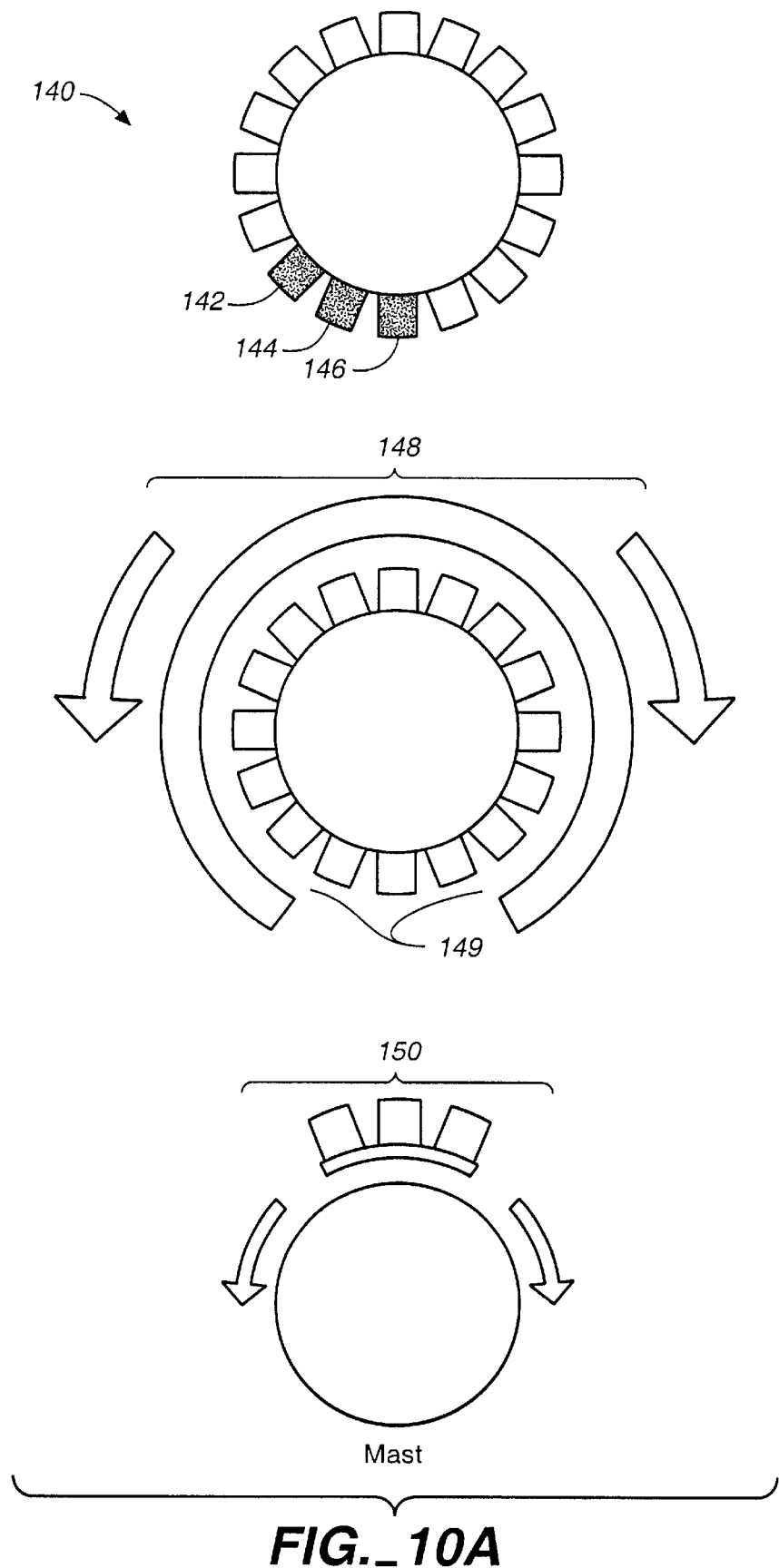
FIG._10A

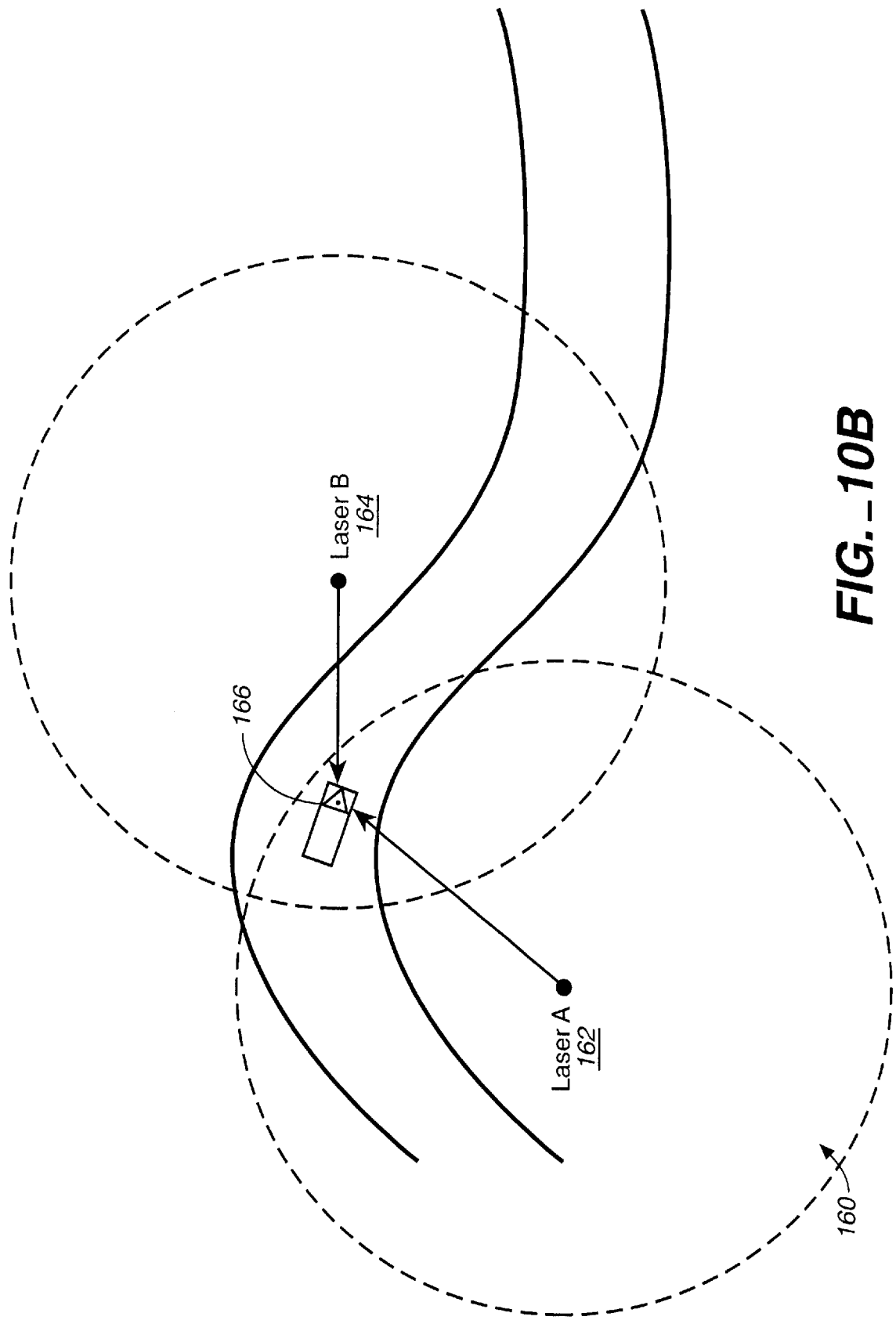
FIG._10B

LASER LEVEL SELECTION

BACKGROUND

The idea of using lasers for controlling machinery is well known in the art. Indeed, in the U.S. Pat. No. 4,807,131 issued to Clegg, a fully automated earth grading system for grading a tract of land is disclosed. The system comprises a power driven earth grading machine which comprises a frame, an earth grading tool, and means for adjusting the earth grading tool relative to the frame. The system additionally includes a laser beam generator remotely located from the earth grading machine for projecting a laser beam in a predetermined pattern relative to the earth to be graded. A detector was carried on the grading machine for receiving the laser beam.

A laser aligned robotic machining system for use in rebuilding heavy machinery is disclosed in the U.S. Pat. No. 5,768,137 issued to Polidoro et al. In this invention a precision positioning system is used for resurfacing and repairing rails and guideways of large, heavy machinery at user's facilities. The precision positioning system comprises several elements including a monorail frame, multiple guides extending along an outer surface of the monorail frame, supports for holding the monorail frame in position, a movable base surrounding the monorail frame and a laser alignment system.

In the U.S. Pat. No. 5,767,479, Kanaoka discloses a laser beam machining apparatus and corresponding method which employs a laser beam to pretreat and machine a workpiece. A laser beam is carried out by irradiating beforehand the laser beam along a final locus for a main machining, under such a condition as to obtain an energy density for forming a groove angled to a surface of a work. Thereafter, the laser beam is irradiated to the groove, while changing only the energy density according to a cutting condition to cut the work.

However, the prior art inventions do not address the following problem. As machines change grade, they quickly move out of the range of the laser, typically (+/−) 1 meter in the vertical direction. If multiple laser systems are set up, they would conflict with each other and be difficult to distinguish one from the other.

What is needed is a multiple laser system combined with a satellite navigational system for controlling grading machine, wherein at each position of the grading machine a single laser is selected to control the vertical coordinate of an implement.

SUMMARY

The present invention is novel and unique because it discloses a multiple laser system combined with a satellite navigational system for controlling grading machine. At each position of the grading machine a single laser is selected to control the vertical coordinate of an implement.

One aspect of the present invention is directed to a system for guiding a grading machine in a job site.

In one embodiment, the system of the present invention comprises: (1) a satellite positioning system (SATPS) receiver configured to obtain the rough position coordinates $(X_{rough\_machine}, Y_{rough\_machine}, Z_{rough\_machine})$ of the grading machine, (2) a laser tracker configured to latch on a single laser beam at each location of the grading machine, and (3) a signal system.

The laser beam provides a reference plane having a high accuracy vertical coordinate $(Z_{laser})$ at each location $(Y_{rough\_machine}, Y_{rough\_machine}, Z_{rough\_machine})$ of the grading machine. The signal system is configured to precisely guide the grading machine according to a given road design by generating a signal proportional to the difference between a design vertical coordinate $(Z_{design})$ and a real time vertical coordinate $(Z_{laser})$ at each location $(X_{rough\_machine}, Y_{rough\_machine}, Z_{rough\_machine})$ of the grading machine.

The SATPS receiver can comprise: (a) a real time kinematic (RTK) global positioning system (GPS) receiver, (b) a GLONASS receiver, (c) a combined GPS/GLONASS receiver, (d) a low Earth Orbiting Communication Satellite (LEOS), (e) a pseudolite, or (f) an inertial navigation system (INS).

In one embodiment, at least one laser system comprises a laser system providing a horizontal reference plane with a constant elevation.

In another embodiment, at least one laser system comprises a laser system providing a tilted reference plane with a changing elevation.

In one embodiment, at least one laser system comprises a modulation system used to modulate the laser beam with attitude and elevation data.

In one embodiment of the present invention, the system further includes a mast configured to physically move up or down the laser tracker in order to latch on one laser beam at each location of the grading machine.

In another embodiment of the present invention, the system further includes a mast including a continuous column of laser trackers, wherein at least one laser tracker is configured to latch on one laser beam at each location of the grading machine.

In one embodiment, the signal system further includes: (a) an electronic design file configured to store a plurality of road design surfaces, and (b) an on-board computer.

The on-board computer is configured to use a road design surface. For each selected road design surface, the on-board computer is configured to perform a number of operations: (a) identify position coordinates $(X_{i-laser}, Y_{i-laser}, Z_{i-laser})$ for each laser system, (b) determine the rough position coordinates $(X_{rough\_machine}, Y_{rough\_machine}, Z_{rough\_machine})$ for each location of the grading machine using the GPS receiver, (c) select the single optimum laser system that is used by the laser tracker to obtain the precise vertical coordinate $(Z_{laser})$ of the grading machine, and (d) determine the cut or fill $(Z_{design}, -Z_{laser})$ by comparing the road design vertical coordinate $(Z_{design})$ with the precise vertical coordinate $(Z_{laser})$ at each ground position $(X_{grade\_machine}, Y_{grade\_machine})$ of the grading machine.

In one embodiment, the system of the present invention further includes a software package TRIMDESIGN used for the selected road design to calculate an optimum number of laser systems to place on the job site, and to calculate the optimum positions $(X^{opt}_{k-laser}, Y^{opt}_{k-laser}, Z^{opt}_{k-laser})$ for each laser system.

In one embodiment, the system of the present invention further includes: (a) a Trimble hand-held field computer, and (b) a field RTK GPS receiver.

In this embodiment, the optimum laser positions $(X^{opt}_{k-laser}, Y^{opt}_{k-laser}, Z^{opt}_{k-laser})$ for each "k"-th laser system are transferred to the Trimble hand-held field computer, and the actual laser positions $(X^{actual}_{k-laser}, Y^{actual}_{k-laser})$ for each "k"-th laser system are determined by using the field RTK GPS receiver.

In this embodiment, the precise vertical coordinate $(Z^{actual}_{k-laser})$ for each "k"-th laser system can be determined by using an optical or electronic leveling method, and the actual coordinates ($X^{actual}_{k-laser}$, $Y^{actual}_{k-laser}$, $Z^{actual}_{k-laser}$) for each "k"-th laser system can be communicated back to the on-board computer from the Trimble hand-held field computer using a communication link in real time.

Another aspect of the present invention is directed to a method for guiding a grading machine.

In one embodiment, the method comprises the following steps: (a) generating the rough position coordinates ($X_{rough\_machine}$, $Y_{rough\_machine}$, $Z_{rough\_machine}$) of the grading machine, (b) obtaining precise vertical coordinate ($Z_{laser}$) of the grading machine by latching on a single optimal laser beam at each location of the grading machine, (c) processing the rough coordinate data ($X_{rough\_machine}$, $Y_{rough\_machine}$, $Z_{rough\_machine}$), the precise vertical coordinate laser data ($Z_{laser}$) and a road design ($Z_{design}$) data by using an on-board computer, and (d) performing the precise vertical guiding of the grading machine.

In one embodiment, the step of performing the precise vertical guiding of the grading machine further includes the steps of: (e) displaying the rough position coordinates ($X_{rough\_machine}$, $Y_{rough\_machine}$, $Z_{rough\_machine}$) of the grading machine, the precise vertical coordinate ($Z_{laser}$) of the grading machine, and the road design data ($Z_{design}$) on a display of the on-board computer, (f) determining the cut or fill ($Z_{design} - Z_{laser}$) by comparing the road design vertical coordinate ($Z_{design}$) with the precise vertical coordinate ($Z_{laser}$) at each ground position ($X_{grade\_machine}$, $Y_{grade\_machine}$) of the grading machine by using the on-board computer, and (g) automatically adjusting hydraulic hoses to drive the cutting blade of the grading machine down or up according to the cut or fill ($Z_{design}$, $-Z_{laser}$) by using the on-board computer.

BRIEF DESCRIPTION OF THE DRAWINGS

FIG. 1 depicts profile of a curved job site in sections.

FIG. 2 shows profile of a curved job site covered by a single laser system.

FIG. 3 illustrates profile of a curved job site covered by a plurality of laser systems.

FIG. 4 depicts an integrated satellite navigational and laser detector system for guiding a grading machine in profile of a curved job site of FIG. 3.

FIG. 5 shows the system of the present invention including the GPS receiver in the differential mode.

FIG. 6 depicts an intelligent laser tracker.

FIG. 7 illustrates a signal system including an electronic design file, an on-board computer, and a software package TRIMDESIGN.

FIG. 8 depicts a laser system comprising a modulation system used to modulate the laser beam with positional data and with laser system ID tag.

FIG. 9 shows the flow chart of the method of the present invention.

FIG. 10A depicts the rotating laser hood that limits the field of view.

FIG. 10B illustrates a plain view of latching of laser tracker on the preferred laser source.

FULL DESCRIPTION OF THE PREFERRED EMBODIMENTS

FIG. 1 depicts profile of a curved job site (10) that is graded in sections. The heavy lines (12) are where the road (10) is straight. The lighter lines (14) are where there are vertical curves.

A single laser system (see detailed discussion of a laser system below) can be set to cover any one straight section (12 of FIG. 1) of the road (10). The grey area (22 of FIG. 2) between two parallel lines (24 and 26) of the road (10) represents the section of the road (10) over which a laser signal generated by a single laser system can be received. The section (22) is proportional to the product of the length that a laser signal can propagate without significant loss of its amplitude times the height range of the laser receiver.

If a grading machine is equipped with a navigational system comprising a laser detector and a navigational computer, the grading machine can be guided in the short straight section (28 of FIG. 2) in the middle of the section (22).

If a grading machine is equipped with a navigational system comprising a laser detector, a satellite navigational system, and a navigational computer, the grading machine can be guided in the curved areas within the whole section (22). See discussion below.

FIG. 3 depicts a job site, that is part of the road (10) to be graded, that is covered by a plurality of laser systems. As depicted in FIG. 3, several road areas (36, 38, 40, 44) are covered by at least two laser beams at the same time. In each of these areas the laser detector mounted in a grading machine can be confused so that the operator would not be able to correctly identify the source of the particular laser beam that the laser detector is locked on. Thus, the laser receiver would be unable to obtain guidance from the laser system that it is locked on unless the laser receiver can identify the laser system that generated that particular laser beam.

The subject of the present invention is an integrated satellite navigational and laser detector system (50 of FIG. 4) for guiding a grading machine in profile of a curved job site section (10) of FIG. 3.

As depicted in FIG. 4, the system (50) comprises: a satellite positioning system (SATPS) receiver (54) including an antenna (56), a laser tracker (58), and a signal system (64).

The SATPS receiver (54) is configured to obtain the rough position coordinates ($X_{rough\_machine}$, $Y_{rough\_machine}$, $Z_{rough\_machine}$) of the grading machine (52).

The laser tracker (58) mounted in a mast (62) is configured to latch on a single laser beam (72) at each location ($X_{rough\_machine}$, $Y_{rough\_machine}$, $Z_{rough\_machine}$) of the grading machine (52).

Each laser beam (72) is generated by a laser system (70) that is a part of a plurality of laser systems (not shown) covering the job site (10 of FIG. 3). Each laser beam (72) provides a reference plane having a high accuracy vertical coordinate ($Z_{laser}$) at each location ($X_{rough\_machine}$, $Y_{rough\_machine}$, $Z_{rough\_machine}$) of the grading machine. See full discussion below.

The signal system (64) is configured to precisely guide the grading machine (52) according to a given road design (see discussion below) by generating a signal proportional to the difference between a design vertical coordinate ($Z_{design}$) and a real time vertical coordinate ($Z_{laser}$) at each location ($X_{rough\_machine}$, $Y_{rough\_machine}$, $Z_{rough\_machine}$) of the grading machine (52).

There are several well known satellite based navigational systems.

In one embodiment, the satellite based navigational system (SATPS) comprises the GPS (global positioning system).

The GPS is a system of satellite signal transmitters, with receivers located on the Earth's surface or adjacent to the Earth's surface, that transmits information from which an observer's present location and/or the time of observation can be determined.

The GPS is part of a satellite-based navigation system developed by the United States Department of Defense (DOD) under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1=154 f0 and f2=120 f0 of a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of $f_p$=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f_{C/A}$=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

In another embodiment, the satellite based navigational system (SATPS) comprises the Global Orbiting Navigational System (GLONASS).

The Global Orbiting Navigation Satellite System (GLONASS) was placed in orbit by the former Soviet Union and is now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=1,2, . . . 24) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites.

An SATPS antenna (56 of FIG. 4) receives SATPS signals from a plurality (preferably four or more) of SATPS satellites (60, 61, 64, 66 of FIG. 4) and passes these signals to an SATPS signal receiver/processor (54), which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta$ti), wherein ($\Delta$ti) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range $R_i$ to the satellite but only the pseudo-range ($r_i$) to each SATPS satellite.

After the SATPS receiver determines the coordinates of the i-th SATPS satellite by picking up transmitted ephemeris constants, the SATPS receiver can obtain the solution of the set of the four equations for its unknown coordinates (x0, y0, z0) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SATPS receiver.

The C/A code modulated phase quadrature carrier component of the L1 signal is provided for commercial use. In certain applications, it is sufficient to use only the L1 signal carrier.

In one embodiment, the SATPS receiver (54 of FIG. 4) comprises a combined GPS/GLONASS receiver.

In another embodiment, the SATPS receiver (54 of FIG. 4) comprises a differential GPS receiver.

In this embodiment, as depicted in FIG. 5, a configuration of two or more receivers can be used to accurately determine the relative positions between the receivers and stations. In differential position determination, many of the errors in the SATPS signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms.

The differential GPS receiver can include: (a) a real time code differential GPS; (b) a post-processed (PP) differential GPS; (c) a real-time kinematic (RTK) differential GPS that includes a code and carrier RTK differential GPS receiver; and (d) a PP Kinematic GPS.

The differential GPS receiver can obtain the differential corrections from different sources.

In one embodiment, the differential GPS receiver (84 of FIG. 5) can obtain the differential corrections from a Reference (Base) Station. The fixed Base Station (BS) (82 of FIG. 5) placed at a known location determines the range and range-rate measurement errors in each received GPS signal and communicates these measurement errors as corrections to be applied by local users. The Base Station (BS) has its own imprecise clock with the clock bias $CB_{BASE}$. As a result, the local users are able to obtain more accurate navigation results relative to the base station location and the base station clock. With a proper equipment, a relative accuracy of 5 meters should be possible at distances of a few hundred As kilometers from the Base Station.

In another embodiment, the differential GPS receiver can be implemented using a TRIMBLE Ag GPS -132 receiver that obtains the differential corrections from the U.S. Cost Guard service free in 300 kHz band broadcast. In this embodiment, the integrated SATPS and laser system (10) should be placed within (2–300) miles from the U.S. Cost Guard Base Station. The accuracy of this differential GPS method is about 50 cm.

In one more embodiment, the differential corrections can be obtained from the Wide Area Augmentation System (WAAS). The WAAS system includes a network of Base Stations that uses satellites (initially geostationary satellites—GEOs) to broadcast GPS integrity and correction data to GPS users. The WAAS provides a ranging signal that augments the GPS, that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm.

The WAAS provides the differential corrections free of charge to a WAAS-compatible user. The accuracy of this method is less than 1 meter.

In one more embodiment, three satellite commercial services (Omnistar, Racal, or Satloc), or the satellite system operated by the Canadian Government, that broadcast the differential corrections can be used. The accuracy of this method is (10–50) cm.

In the preferred embodiment, the GPS receiver can comprise a real time kinematic (RTK) GPS receiver.

In one more embodiment, the real time kinematic (RTK) differential GPS receiver can be used to obtain the position locations with less than 2 cm accuracy.

The RTK differential GPS receiver receives the differential corrections from a Base Station placed in a know location within (10–50) km from the local user.

In one more embodiment, a wide area system as described in the U.S. patent application Ser. No. 08/935,683, "Two-tone beacon transmitter and receiver" by Enge, can be employed to create and distribute the differential corrections. The U.S. patent application Ser. No. 08/935,683 is incorporated by reference herein in its entirety.

Because the receiver can only examine one cycle at a time, for high accuracy measurement, the number of whole cycle carrier phase shifts between a particular GPS satellite and the RTK GPS receiver is resolved. Thus, the RTK GPS receiver solves in real time the "integer ambiguity" problem. Indeed, the error in one carrier cycle L1 (or L2) being 19 (or 24) centimeters can change the measurement result by several centimeters, which is an unacceptable error for the centimeter-level accuracy measurements.

The laser system (70 of FIG. 4) can be implemented using a rotating laser system.

Rotating lasers were introduced in the early 1970's. The rotating laser system can be implemented when a laser spins in the horizontal plane, or Z-plane, and provides an accurate reference plane with a millimeter accuracy. The rotating laser emits a laser beam. However, to detect and get benefit of the rotating laser beam, the potential user has to be located within vertical range. The user has to be equipped with a laser detector (or a laser receiver) capable of receiving the rotating laser beam. The rotating laser beam can be rotated mechanically or optically. In the mechanic embodiment, the motor physically rotates the laser and accordingly the laser beam. In the optical embodiment, the mirror rotates in such a way that the physically non-rotating laser emits the rotating laser beam.

Topcon, Laser Systems, Inc., located in Pleasanton, Calif., manufactures Topcon RL-SI rotating laser systems with the following specifications: a laser source is a 633 nm visible diode with horizontal self leveling range of (+/−) 10 arc minutes, with vertical self leveling Range of (+/−) 10 arc minutes, with vertical accuracy of (+/−) 20 arc seconds, with horizontal accuracy of (+/−) 15 arc seconds, with operating range of (60–300) meters depending on the target's laser receiver. The RL-SI Topcon laser system generates a bright, self-leveling laser beam that can provide a precise horizontal reference plane (Z-plane) for horizontal leveling of ceiling grids.

Referring back to FIG. 4, at least one laser system (70) can comprise: (a) a laser system providing a horizontal reference plane with a constant elevation; (b) a laser system providing a tilted reference plane with a changing elevation; (c) a one angle slope plane laser system providing a one angle slope reference laser plane; or (d) a dual angle slope plane laser system providing a dual angle slope reference laser plane.

Topcon manufactures an RL-H -horizontal laser system that provides extremely wide electronic self-leveling, long transmitting range and simple one-touch operation laser system. Topcon also produces an RL-H2S/RL-H1S Dual/Single slope laser system that generates a rotating laser beam providing a dual angle/single angle slope laser plane.

In one embodiment, the integrated satellite navigational and laser detector system of the present invention (50 of FIG. 4) further includes a laser tracker (or laser detector) (58) that is configured to physically move up or down the mast (62) in order to latch on one laser beam at each location of the grading machine.

In one embodiment, the mast (62 of FIG. 4) includes a continuous column of laser trackers (not shown), wherein the at least one laser tracker is configured to latch on one laser beam at each location of the grading machine.

In one embodiment, the laser detector (or tracker) (58 of FIG. 4) comprises a standard laser detector.

The standard laser detector can comprise: (1) a plane surface mirror, (2) a spherical detector, (3) a solid glass prism detector (corner cube detector), (4) hollow corner cube detector, (5) acrylic retrodetector, or (6) a reflective sheeting.

In another embodiment, the laser detector (58 of FIG. 4) comprises an intelligent laser detector.

As depicted in FIG. 6, the intelligent detector (58) includes a standard laser detector (90), a memory unit (92) that stores the identification number (ID) of the mobile unit, and a processor (94).

In one embodiment, when the signal system (64) is separated from the grading machine (52 of FIG. 4), the intelligent detector (58 of FIG. 6) includes a communication system (98) configured to transmit the laser system ID to the signal system (64) for further processing.

The laser tracker can latch on the desired laser source if one can limit the field of view of the laser tracker and the direction of the laser tracker can be calculated and set. The limitation of the filed of view of the laser tracker can be implemented in a variety of ways.

As shown in FIG. 10A, in one embodiment, the rotating laser hood (148) can limit the field of view of the laser tracker (149). In another embodiment, laser sensors (150) can rotate around the mast (not shown) to point at the desired source laser. In yet another embodiment, only the laser sensors (142, 144, 146, shown in solid) in the desired direction are activated.

The direction of the laser tracker can be calculated and set. Indeed, let us assume that XYZ position of the laser (A) (162) is known (see FIG. 10B) and 5 the GPS XYZ position of the grading machine (166) is also known. Hence, the vector from the grading machine (166) to the laser (A) can be calculated. The heading or direction of the grading machine is known, typically from the difference between successive GPS positions but may also be determined from a compass, INS, or other means. By combining the vector from the grading machine to the laser (A) with the heading of the grading machine, the direction of the laser tracker can be calculated and set, thus latching on the desired laser source, for instance, laser (13) (164).

In one embodiment, as depicted in FIG. 7, the signal system (64 of FIG. 4) further includes an electronic design file (102) and an on-board computer (104).

The electronic design file (102) is configured to store a plurality of road design surfaces. The on-board computer (104) is configured to select a road design surface.

In one embodiment, for the selected road design surface the on-board computer is configured to identify position coordinates ($X_{i\text{-}laser}$, $Y_{i\text{-}laser}$, $Z_{i\text{-}laser}$) for each laser system, so that the number of lasers and the overlap between them is minimized.

For example, as shown in FIG. 3, the on-board computer for the road profile (10) identifies: (a) position coordinates ($X_{1\text{-}laser}$, $Y_{1\text{-}lasers}$, $Z_{1\text{-}laser}$) for the laser system #1 (33 of FIG. 3) that generates a laser beam (39) covering the road segments (30 and 36); (b) position coordinates ($X_{2\text{-}laser}$, $Y_{2\text{-}laser}$, $Z_{2\text{-}laser}$) for the laser system #2 (35 of FIG. 3) that generates a laser beam (31) covering the road segments (36, 32 and 38); (c) position coordinates ($X_{3\text{-}laser}$, $Y_{3\text{-}laser}$, $Z_{3\text{-}laser}$) for the laser system #3 (43 of FIG. 3) that generates a laser beam (37) covering the road segments (38, 34 and 40); (d) position coordinates ($X_{4\text{-}laser}$, $Y_{4\text{-}laser}$, $Z_{4\text{-}laser}$) for the laser system #4 (48 of FIG. 3) that generates a laser beam (41) covering the road segments (46 and 44); and (e) position coordinates ($X_{5\text{-}laser}$, $Y_{5\text{-}laser}$, $Z_{5\text{-}laser}$) for the laser system #5 (49 of FIG. 3) that generates a laser beam (47) covering the road segments (40, 42 and 44).

The on-board computer (104 of FIG. 7) is also configured to determine the rough position coordinates ($X_{rough\_machine}$, $Y_{rough\_machine}$, $Z_{rough\_machine}$) for each location of the grading machine using the GPS receiver (54 of FIG. 4).

At each ground position ($X_{grade\_machine}$, $Y_{grade\_machine}$) of the grading machine the on-board computer is configured to determine the cut or fill ($Z_{design}$–$Z_{laser}$) by comparing the road design vertical coordinate ($Z_{design}$) with the precise vertical coordinate ($Z_{laser}$).

In one embodiment, the on-board computer (104 of FIG. 7) for each location of the grading machine ($X_{rough\_machine}$, $Y_{rough\_machine}$, $Z_{rough\_machine}$) is configured to select the single optimum laser system that is used by the laser tracker to obtain the precise vertical coordinate ($Z_{laser}$) of the grading machine.

In this embodiment, the signal system (64 of FIGS. 4 and 7) of the present invention further includes a software package TRIMDESIGN (106 of FIG. 7). The software package TRIMDESIGN is used for each selected road design to calculate an optimum number K of laser systems to be placed on the job site and to calculate the optimum positions ($X^{opt}_{j\text{-}laser}$, $Y^{opt}_{j\text{-}laser}$, $Z^{opt}_{j\text{-}laser}$) for each "j"-th laser system, j is an integer less than or equal to K, K is an integer. In this embodiment, K optimally placed laser systems provide a plurality of K reference planes optimally covering the selected road design.

The field operator can use a device including a field SATPS receiver (76), a hand held computer (78) and a field transmitter (79) to determine and communicate to the signal system (64) of the grading machine (52) in real time the actual coordinates of a laser system (70).

In one embodiment of the present invention, the optimum laser positions ($X^{opt}_{laser}$, $Y^{opt}_{laser}$, $Z^{opt}_{laser}$) for each laser system (70) determined by the signal system (64 of FIGS. 4 and 7) can be transferred to the Trimble hand-held field computer (78) using a mobile transceiver (63), a field receiver (79) and a communication link (65).

In one embodiment, the field SATPS receiver (76) includes a real time kinematic (RTK) GPS receiver. In this embodiment, the operator using the RTK GPS receiver (76) including a field GPS antenna (74) determines the actual laser positions ($X^{actual}_{laser}$, $Y^{actual}_{laser}$) for each laser system (70) in real time with a centimeter accuracy.

In another embodiment, as it is well known in the art of surveying, the precise vertical coordinate ($Z^{actual}_{laser}$) for the laser system (70) can be determined in real time with a millimeter accuracy by using an optical or electronic leveling method.

The actual coordinates ($X^{actual}_{laser}$, $Y^{actual}_{laser}$, $Z^{actual}_{laser}$) for the laser system (70) then can be communicated back to the on-board computer using the same communication link (65).

In one embodiment, the communication link (65) includes a real time communication link.

In one embodiment, the real time communication link (65) further includes a radio link.

In one embodiment, the real time communication link (65) further includes a cable download.

In one embodiment, the actual coordinates ($X^{actual}_{laser}$, $Y^{actual}_{laser}$, $Z^{actual}_{laser}$) for the laser system (70) can be communicated back to the on-board computer using a data card.

In one embodiment, as depicted in FIG. 8, at least one laser system (70 of FIG. 4) emanating a laser beam (72) further comprises a modulation system (110) used to modulate the laser beam (72) with positional data and with the laser system ID tag. In this embodiment, the laser detector (58 of FIGS. 4 and 6) should include a decoder (99 of FIG. 6) for reading the ID tag encoded in each received laser beam (72) in order to identify for each received laser beam a laser system that generated that particular laser beam.

The modulation and demodulation of the laser beam can be easily achieved. Indeed, it is well known to those skilled in the art, that there are infrared emitting and lasing diodes that can be easily modulated and demodulated.

J. M. Rueger in the "Electronic Distance Measurement" published by Springer-Verlag, Germany, in 1996, provides valuable introduction into this subject. This book is specifically referred to in the following discussion.

Infrared emitting and lasing diodes provide a low cost, light weight, small, low voltage and low current alternative to gas lasers.

In FIG. 8, an emitting diode (112) represents a part of the laser system (70).

Infrared diodes can be classified according to their structure, operation, manufacturing process and direction of emission. All devices feature an active region (or laser cavity) which consists typically of undoped low-bandgap material surrounded by higher bandgap n-type (donor) and p-type (acceptor) material.

In the GA Al As emitting diode under forward bias, electrons from the n-region and holes from the p-type region are injected into the active region. The confinement of these carriers to the active region is achieved by the energy barriers and refractive index steps at each heterojunction. This confinement leads to electron-hole recombination in the active layer that generates spontaneous and incoherent infrared emission in all directions. The external quantum efficiency of such LED's (Light Emitting Diodes), namely the ratio of emitted photons to input electrical power, is only a few percent. The high refractive index of the Ga Al As semiconductor material (3.5 to 3.6) causes most of the radiation to be reflected (by total reflection) at the semiconductor/air interfaces and absorbed internally. The Ga Al As emitting diode emits wavelengths between 710 and 900 nm.

The working principles of lasing diodes are as follows. Each photon generated within the active layer can stimulate the recombination of additional electron-hole pairs to emit photons that are coherent, that is they have the same wavelength and phase. With increased injection current, the gain due to the stimulation emission can approach and then exceed the absorption losses in the active layer. The device becomes an amplifier and exhibits a narrowing of the emitted spectrum as well as an abrupt increase of radiated power (lasing). Amplification is greater parallel to the active layer.

Because of the basically linear relationship between input (injection) current and output power (radiant flux) of infrared emitting diodes (over entire operating range) and lasing diodes (specific regions below and above threshold current only), the infrared output beam can be easily directly modulated. For example, a sinusoidal variation of the drive current between 10.2 A and 11.8 A leads to a sinusoidal modulation of the output power between 0.2 W and 0.75 W.

The direct demodulation can be performed by utilizing photodiodes that have the property of transforming radiation into electrical current: the higher the radiation power, the higher the current flow through the diode. The silicon (PIN) photodiodes or Si-avalanche photodiodes (APD) can be used for the purpose of direct demodulation of the modulated laser beam.

As shown in FIG. 8, an optical system (114) can be used for an indirect modulation of the laser beam generated by the emitting diode (112).

In one embodiment, the indirect modulation can be achieved by passing a continuous light beam through two polaroid filters of perpendicular polarization planes. Between the two filters the plane of the polarized light can be rotated by a Kerr cell in phase with a modulation signal. This results in an amplitude modulated light beam emerging from the second filter.

In one embodiment, the indirect demodulation can be achieved by using a photomultiplier that can convert the light into electric current.

The reflected laser beam can be also used to transmit the positional information of the grading machine at the time of illumination by the laser beam to the signal system.

Another aspect of the present invention is directed to a method for guiding a grading machine.

In one embodiment, as shown in the flow chart (120 of FIG. 9, the method of the present invention comprises the following steps.

In the step (122), rough position coordinates ($X_{rough\_machine}$, $Y_{rough\_machine}$, $Z_{rough\_machine}$) of the grading machine are generated by using the satellite navigational system (54 of FIG. 4). In the step (124), at given location ($X_{rough\_machine}$, $Y_{rough\_machine}$, $Z_{rough\_machine}$) of the grading machine, precise vertical coordinate ($Z_{laser}$) of the grading machine can be obtained by latching on a single optimal laser beam (72 of PIG. 4).

In the next step (126), the rough coordinate data ($X_{rough\_machine}$, $Y_{rough\_machine}$, $Z_{rough\_machine}$) the precise vertical coordinate laser data ($Z_{laser}$) and a road design ($Z_{design}$) data are processed by using the on-board computer (104 of FIG. 7). Finally, in the step (128), the precise vertical guiding of the grading machine is performed by using the on-board computer (104 of FIG. 7).

In one embodiment, the step of obtaining the precise vertical coordinate of the grading machine further includes the following steps: (a) placing a plurality of laser systems at optimal locations so that at least one laser system generates a laser beam having a precise vertical coordinate ($Z_{laser}$) at the given location of the grading machine, (b) latching on one optimal laser beam at the given location of the grading machine, and (c) obtaining the precise vertical coordinate ($Z_{laser}$) of the grading machine by using the optimal laser beam.

In one embodiment, when the laser system (70 of FIG. 8) is equipped with the modulation system (110), and the laser detector (58 of FIG. 6) includes an intelligent detector, the step of obtaining the precise vertical coordinate ($Z_{laser}$) of the grading machine at the given location further includes the steps of: (a) reading an ID tag encoded in the received laser beam by using the decoder (99 of FIG. 6) in order to identify a laser system that generated the received laser beam, and (b) reading the precise vertical coordinate ($Z_{laser}$) of the identified optimal laser system.

In one embodiment, the step of performing the precise vertical guiding of the grading machine using the on-board computer (104 of FIG. 7) further includes the following steps: (a) displaying on a display of the on-board computer the rough position coordinates ($X_{rough\_machine}$, $Y_{rough\_machine}$, $Z_{rough\_machine}$) of the grading machine, the precise vertical coordinate ($Z_{laser}$) of the grading machine, and the road design data ($Z_{design}$), (b) determining the cut or fill ($Z_{design}-Z_{laser}$) by comparing the road design vertical coordinate ($Z_{design}$) with the precise vertical coordinate ($Z_{laser}$) at each ground position ($X_{grade\_machine}$, $Y_{grade\_machine}$) of the grading machine, and (c) automatically adjusting the hydraulic hoses to drive the cutting blade of the grading machine down or up according to the signal proportional to the cut or fill ($Z_{design}-Z_{laser}$).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A system for guiding a grading machine in a job site comprising:

a satellite positioning system (SATPS) receiver configured to obtain the rough position coordinates $X_{rough\_machine}$, $Y_{rough\_machine}$, $Z_{rough\_machine}$) of said grading machine;

a laser tracker connected to said SATPS receiver, said laser tracker configured to latch on a single laser beam at each location of said grading machine, each said laser beam being generated by a laser system, each said laser system being part of a plurality of laser systems covering said job site, each said laser beam providing a reference plane having a high accuracy vertical coordinate ($Z_{laser}$) at each said location ($X_{rough\_machine}$, $Y_{rough\_machine}$, $Z_{rough\_machine}$) of said grading machine;

a signal system connected to said laser tracker and connected to said SATPS receiver; said signal system further including:

an electronic design file configured to store a plurality of road design surfaces; and an on-board computer; wherein said on-board computer is configured to select a road design surface; and wherein said on-board computer is configured to determine the rough position coordinates ($X_{rough\_machine}$, $Y_{rough\_machine}$, $Z_{rough\_machine}$) for each location of said grading machine using said SATPS receiver; and a software package TRIMDESIGN used for said selected road design to calculate an optimum K number of laser systems to place on said job site, K being an integer, and to calculate the optimum positions ($X^{opt}_{k\text{-}laser}$, $Y^{opt}_{k\text{-}laser}$, $Z^{opt}_{k\text{-}laser}$) for each said "j"-th laser system, j being an integer less than or equal to K; wherein said plurality of K laser systems provides a plurality of K reference planes optimally covering said selected road design;

and wherein said on-board computer for said selected road design surface is configured to identify actual position coordinates ($X_{i\text{-}laser}$, $Y_{i\text{-}laser}$, $Z_{i\text{-}laser}$) for each said "i"-th laser system, i being an integer less than or equal to N, N being an integer;

and wherein said on-board computer for each location of said grading machine is configured to select a single optimum laser system that is used by said laser tracker to obtain the precise vertical coordinate ($Z_{laser}$) of said grading machine;

and wherein said signal system is configured to precisely guide said grading machine according to a given road design by generating a signal proportional to the difference between a design vertical coordinate ($Z_{design}$) and a real time vertical coordinate ($Z_{laser}$) at each said location ($X_{rough\_machine}$, $Y_{rough\_machine}$, $Z_{rough\_machine}$) of said grading machine;

and wherein said on-board computer at each said ground position ($X_{grade\_machine}$, $Y_{grade\_machine}$) of said grading machine is configured to determine the cut or fill ($Z_{design}-Z_{laser}$) by comparing the road design vertical coordinate ($Z_{design}$) with said vertical coordinate $Z_{laser}$).

* * * * *